United States Patent [19]
Dalgleish et al.

[11] Patent Number: 6,040,042
[45] Date of Patent: Mar. 21, 2000

[54] COMPOSITE PLASTICS FILM OR SHEET

[75] Inventors: David Thomson Dalgleish, Frinton-on-Sea; Matthew Richard Sands, Colchester, both of United Kingdom

[73] Assignee: Arjobex Limited, Hertfordshire, United Kingdom

[21] Appl. No.: 09/033,024

[22] Filed: Mar. 2, 1998

[30] Foreign Application Priority Data

Mar. 4, 1997 [GB] United Kingdom .................. 9704470

[51] Int. Cl.$^7$ ........................................................ B32B 5/14
[52] U.S. Cl. .................... 428/308.4; 428/304.4; 428/315.5; 428/315.9; 524/274
[58] Field of Search ................ 428/200, 308.4, 428/314.4, 315.5, 315.9, 304.4, 317.9, 195, 40.1; 526/267, 283; 524/274

[56] References Cited

U.S. PATENT DOCUMENTS

| | | | |
|---|---|---|---|
| 3,635,746 | 1/1972 | Karlan | 117/3.1 |
| 3,981,851 | 9/1976 | Plueddnmann | 526/267 |
| 4,555,436 | 11/1985 | Geurtsen et al. | 428/200 |
| 4,657,706 | 4/1987 | Durkee . | |
| 4,960,637 | 10/1990 | Biczenczuk | 428/314.4 |
| 5,032,449 | 7/1991 | Strom | 428/195 |

FOREIGN PATENT DOCUMENTS

| | | |
|---|---|---|
| 0 703 071 A1 | 8/1995 | European Pat. Off. . |
| 72-67813 | 10/1972 | Japan . |
| 73-09535 | 2/1973 | Japan . |
| 86-200885 | 6/1986 | Japan . |
| 1157320 | 7/1969 | United Kingdom ............ C08B 21/00 |
| 1 470 372 | 3/1973 | United Kingdom . |

*Primary Examiner*—William Krynski
*Assistant Examiner*—Hong J. Xu
*Attorney, Agent, or Firm*—Fay, Sharpe, Fagan, Minnich & McKee

[57] ABSTRACT

This invention relates to a formulation for making a composite plastics film or sheet comprising a polyolefin, a filler and a voiding agent, characterised in that the voiding agent is a pentaerythritol ester of maleic rosin. This is particularly suitable for use on the printable surfaces of synthetic paper. A feature of this rosin is that it minimises the yellowing of the paper.

22 Claims, No Drawings

COMPOSITE PLASTICS FILM OR SHEET

The present invention relates to a formulation for making composite plastics film or sheet having an external printable surface for use as a synthetic paper and to synthetic papers produced therefrom.

The term "synthetic paper" is used herein and throughout the specification to mean plastics film and sheet products having a feel and printability similar to cellulose paper. It has been recognised that plastics sheet of these types can provide an improved alternative to paper where durability and toughness are required. Plastics sheets produced from polyolefins have several advantages over other plastics since they offer UV resistance, good tear strength and the ability to be recycled in many post-consumer waste applications.

Synthetic papers have been produced commercially by the plastics industry for many years and have taken a number of different forms. They have included products having voided (ie multicellular) or unvoided structures, some of which have been coated with filler- and/or pigment-containing surface coatings to improve printing qualities. The voiding technique has frequently been used to reduce the density of the synthetic paper produced. The most common voiding agent used hitherto is a zinc-calcium resinate which causes the voiding when a heated sheet of synthetic paper is stretched. This technique produces a very serviceable sheet which has gained widespread commercial acceptance particularly when it incorporates white inert fillers. These fillers and voids typically give rise to sheets with a brightness (ISO 2470) of 80–88%. This range of brightness is due to the following:

i. The zinc calcium resinate has a yellow colour.
ii. The yellow colour gets more yellow when heat is applied or is exposed to light.
iii. The amount of the resinate used depends upon the components of the sheet treated.
iv. Parts of the sheet may have to be recycled in order to improve the economics of the production process consequently accentuating the yellowing of the product.

It is, therefore, desirable not only to make the sheets whiter by extending the upper limit of the range specified above but also to narrow the spread of this range for brightness by using an additive which is not quite so prone to yellowing.

Accordingly, the present invention is a formulation for making a composite plastics film or sheet comprising a polyolefin, a filler and a voiding agent, characterised in that the voiding agent is a pentaerythritol ester of maleic rosin.

The pentaerythritol ester of maleic rosin is the pentaerythritol ester of the reaction product between maleic anhydride and abietic acid (also known as abietinic acid or sylvic acid). Abietic acid has the molecular formula $C_{19}H_{29}COOH$ is and pentaerythritol (2,2-bis-hydroxymethyl-1,3-propane diol) has the molecular formula $C_5H_{12}O_4$. The pentaerythritol ester of maleic rosin suitably has an average minimum softening point of 168° C. (and is commercially sold as DERTOLINE® MP170). The pentaerythritol ester of maleic rosin used in the formulations of the present invention has the unique characteristic that it is less yellow than the zinc calcium resinate and does not suffer from further intensification of the yellowness upon heating to synthetic paper processing temperatures of up to 230° C. This is a significant advantage considering the fact that this is achieved without adversely affecting the voiding properties associated with conventional zinc calcium resinate. The amount of the pentaerythritol ester of maleic rosin used in the formulation is suitably in the range from 1–30% by weight, preferably from 5–20% by weight per hundred parts by weight of the polyolefin in the formulation.

According to a further embodiment, the present invention is composite plastics film or sheet made from a formulation comprising a polyolefin, a filler and a voiding agent, characterised in that the voiding agent is a pentaerythritol ester of maleic rosin.

The composite plastics film or sheet made from the formulation of the present invention is suitably a synthetic paper. The synthetic paper comprises at least one printable surface layer and a base layer (which can also be termed the core layer if there is more than one surface layer eg one on either side of the base layer). The synthetic paper may be formed either A. by single extrusion of a single composition in which the surfaces and the core portion of the single extrudate represent the surface and base layers respectively, or
B. by co-extrusion of the composite from two or more compositions where the relatively thicker of two layers forms the base layer and the relatively thinner of the two layers represents the surface layer, or
C. by lamination of a plurality of layers whereby at least one of the outermost layers represents the surface layers and the layer(s) below said surface layer or in between the two outer surface layers represent the base layer, or
D. by applying a coating of the printable layer on the surface layer of a sheet produced by any of the methods (A) to (C) above.

Sheet produced by coextrusion and having the coating of a printable layer on the surface thereof are preferred. Methods of lamination and coextrusion are well known in the art. Descriptions of formulations comprising a polyolefin and methods for producing synthetic papers based on polyolefins can be found in our prior published GB-A-1470372, GB-A-1492771 and GB-A-1490512. Further, a description of particularly advantageous coatings can be found in our prior published GB-A-2177413. The concepts of all the aforementioned specifications are included herein by reference except that in each of these, the zinc calcium resinate in the formulation is replaced by the pentaerythritol ester of maleic rosin as the voiding agent according to the present invention.

The pentaerythritol ester of maleic rosin can be used as the voiding agent both in the surface layer and in the base layer but is particularly effective in the base layer.

As mentioned above, fillers are used in films/sheets such as eg synthetic paper intended for printing to provide an appropriate opaque white surface. These fillers are usually selected from inert minerals such as chalk, silica or clay. In addition, minor additives are also used to render the film/sheet anti-static and/or to lower its density.

It is well recognised that polyolefin films have low surface energies and this generally means that printing is difficult because the ink does not readily wet out the surface and the dried ink does not adhere sufficiently to the surface thereof. In order to overcome these problems, the surface of polyolefin films/sheet have frequently been subjected to various treatments such as eg a corona discharge treatment. Such treatments improve ink laydown and adhesion thereon sufficiently to provide a useful material. The material so treated may, in some cases, lack absorption and require specialised printing techniques.

Lack of absorption of such films/sheets such as eg synthetic paper can be overcome by applying thereon a coating comprising a major amount of a absorbent filler and a minor amount of an adhesive binder. The coating can be incorporated during the manufacturing process. Such a method yields a product which is receptive to print and such products have gained wide commercial acceptance. Where such coatings are inconvenient and expensive to apply and require a separate manufacturing process facility, or renders the surface so treated susceptible to the adverse effects of water and solvents a higher amount of a filler such as silica can be employed The base layer in the film or sheet of the synthetic paper comprising polyolefins, filler and the voiding agent may have other components therein such as pigments, other fillers, rubbers and the like. Thus, the base layer may be of any composition such as is described in our prior published GB-A-1470372 and GB-A-1492771 except that the voiding agent is a pentaerythritol ester of maleic rosin. More preferably, the composition of the base layer comprises a blend of an orientable thermoplastic olefin polymer with about 5–15% w/w of the pentaerythritol ester of maleic rosin per hundred parts of the polyolefin in the blend. The pentaerythritol ester of maleic rosin preferably forms, at least in part, a separate phase uniformly distributed within the olefin polymer contained in the total composition of the base layer such that the composition is capable of being extruded and stretched to form a layer having a voided structure. More preferably, the composition of the base layer comprises a blend, within the aforementioned range, of a high density polyethylene and a pentaerythritol ester of maleic rosin. In a preferred embodiment, the composition of the base layer is as follows (Table 1):

TABLE 1

BASE LAYER COMPOSITION

| Component | Parts by weight |
| --- | --- |
| High density polyethylene (copolymer) | 100 |
| Pentaerythritol ester of maleic rosin | 5–15 |
| Polystyrene | 4.5–5.5 |
| High density polyethylene (homopolymer) | 17.5–21 |
| Calcium carbonate filler | 15–25 |
| Titanium dioxide | 5–10 |
| Styrene-butadiene copolymer | 0–1.0 |
| Calcium oxide | 0.4–1.0 |

The above base layer composition may optionally contain other additives such as eg an antioxidant and a lubricant.

The term high density polyethylene as used above and throughout the specification is meant to include, unless otherwise specified, polymers and copolymers of ethylene with minor amounts of other α-olefin monomers as is commonly understood in the industry and as described in the above-mentioned GB-A specifications. The term also includes mixtures of high density polyethylenes.

The thickness of the base layer is suitably greater than about 10 µm, is preferably greater than about 40 µm and is more preferably in the range from about 45–500 µm.

The surface layer of the synthetic paper, which may be a co-extrudate, is capable of receiving print and comprises a polyolefin. The polyolefin is suitably polyethylene but may comprise a mixture of olefin polymers.

The printable surface layer has a surface which is suitably textured or modified by the presence of a pigment and/or a filler and/or a pentaerythritol ester of maleic rosin and suitably has a printability corresponding to a wettability of at least 40 dynes/cm.

The thickness of the surface layer is suitably below 50 µm, is preferably below 10 µm and is more preferably from about 1 to 8 µm.

The composition of the surface layer may also include other additives such as eg a lubricant (0–0.4% w/w); a wax, stearic acid or a metal stearate, especially calcium stearate; and an antistatic agent (0–2% w/w, preferably 0.5–1.5% w/w of the ethoxylated amine type all weights being based on the weight of the principal polyolefin component of the composition.

The presence of fillers and/or pigments in the surface layer(s) provides a better grip during stretching of the co-extruded layers.

The base layer and one or more of the surface layers may be co-extruded using co-extrusion equipment known in the plastics industry which may comprise one extruder for the composition employed to generate each layer and is adapted to feed a co-extrusion die fitted eg with appropriate flow distribution control or to feed a conventional die via an appropriate distributor block. More preferably, the co-extruded film or sheet comprising eg three layers with the base layer being sandwiched between two surface layers is made in a single step using separate extruders for the base and surface layers but using a single die block.

The film or sheet so formed may be oriented by stretching in a uniaxial or biaxial direction(s) according to known methods and this may be carried out sequentially or simultaneously. It is preferable to orientate the film/sheet by simultaneous biaxial stretching. Such orientation may be achieved eg by co-extruding the layers in the form of a tube and inflating it in a known manner. However, to achieve a flat laying product, the layers are preferably co-extruded to form a continuous sheet or web which is then stretched employing a flat-bed stretching apparatus preferably of the type described in our prior published GB-A-1374574 and GB-A-1442113. Stretching of thermoplastic webs using such apparatus is described in our prior published GB-A-1490512. The methods described in these publications are incorporated herein by reference.

The film or sheet produced from the formulations according to the present invention may be subjected to various treatments and surface coatings eg to enhance antistatic and printing qualities. It will be understood, however, that the surface layer destined to provide an external printable surface will usually be subjected to surface treatment such as oxidation via flame or corona discharge treatment to provide a more polar surface and the required wettability to more readily accept inks and coatings. Clearly, such treatments may be applied to the surface of a surface layer, whether or not such a layer is co-extruded to form the film or sheet.

Coatings that may be applied to the film or sheet so produced include aqueous coatings commonly used in the paper industry and especially latex-based coatings. Of particular value in the present context, however, are the coatings described in our prior published GB-A-2177413 as hereinbefore mentioned. It will be appreciated that adhesive coatings such as pressure-sensitive and heat-activable coatings may be alternatively or additionally applied to the film or sheet as may be desirable for particular uses such as eg making, labels which may be self-adhesive and may optionally have a peelable liner, tags, airline baggage tags, hospital tags for patients etc.

A particular feature of the present invention is that the films and sheets thus produced:

a. have an improved brightness with a narrower range of spread;

b. are free from risk of yellowing whether as such or upon being subjected to heating, stretching or upon storage;

c. are not adversely affected by the use of the new voiding agent;

d. are integral;

e can give improved key to further applied coatings; and f. have mechanical properties determined by the central thicker layer which may be substantially non-absorbent.

The present invention is further illustrated with reference to the following Examples:

EXAMPLE 1

The following composition was used to produce Compound "A" (used in the production of the core material):

TABLE 2

| Component | Parts by Wt |
|---|---|
| Rigidex ® 002/55 HDPE copolymer (MFI 0.2 g/10 min & density 0.955 Kg/m³, ex BP Chemicals Ltd) | 100 |
| Rigidex ® HD6070EA HDPE (MFI 7.5 g/10 min & density 0.96 Kg/m³, ex BP Chemicals Ltd) | 17.6 |
| Polystyrene Grade KF888 (ex BP Chemicals Ltd) | 4.8 |
| DERTOLINE ® MP 170 | 6.0 |
| Cariflex ® TR1102 Styrene-butadiene-styrene copolymer (ex Shell UK Ltd) | 0.6 |
| Anhyd. CaCO₃ (2.5µ particle size, OMYA ex Craxton & Garry) | 21.0 |
| TiO2 (Rutile) RCR2 (ex Tioxide) | 5.8 |
| Armostat ® 400 (antistat, ex Akzo Chemicals Ltd) | 0.14 |
| Armostat ® 375D (antistat, ex Akzo Chemicals Ltd) | 0.35 |
| Caloxal ® CPA (CaO, ex Sturge Lifford Ltd) | 0.58 |
| Calcium Stearate (ex RTZ Chemicals Ltd) | 0.04 |
| Irganox ® B215 (antiox., ex Ciba-Geigy Ind Ltd) | 0.29 |

HDPE—High density polyethylene
MFI—Melt flow index
Compound "A" was prepared from the above components as follows:

Separate, melt blended, cooled and diced masterbatches (Al and B) were obtained from the above with the calcium carbonate and titanium dioxide respectively and comprised:

TABLE 3

| A1 | | B | |
|---|---|---|---|
| Calcium carbonate | 60% w/w | Titanium dioxide | 60% w/w |
| Rigidex ® HD6070EA | 39.6% w/w | Rigidex ® HD6070EA | 39.6% w/w |
| Armostat ® 400 | 0.4% w/w | Calcium Stearate | 0.4% w/w |

Masterbatches Al and B were then intermixed in appropriate proportions with the remainder of the ingredients of the composition and fed to a compounding extruder. The composition was melt blended at approximately 200° C., extruded, cooled and diced to form Compound A.

Compound "A" was fed to an in-line extruder of a twin extruder-distributor-sheeting die co-extrusion arrangement and Compound "B" was mixed at 20% with Rigidex® HD 002/55 HDPE and fed to a secondary extruder. The sheeting die and distributor were of conventional type enabling a three-layer co-extrudate to be produced continually comprising a layer of Compound "B" on each side of a layer of Compound "A".

The extruders were arranged to enable each to form and feed a substantially homogeneous melt into the distributor which was maintained at a temperature of 210° C. The die lips were adjusted to approximately 5mm and the flow of each of the melts was adjusted to give a composite layered extrudate about 395 mm wide at an extrusion rate of 360 Kg/hr.

The composite extrudate was then fed directly onto and around a set of cooling and conditioning rollers running at a peripheral speed whereby the core material was brought to a temperature of approximately 122° C. and the outer layers each to a temperature of approximately 118° C. This resulted in a conditioned composite extrudate having an overall thickness of 1.5mm, a core thickness of 1.32mm and two outer layers each being about 0.09 mm thick.

The thus conditioned composite extrudate was then fed into a simultaneous biaxial stretching apparatus of the type described in our published GB-A-1442113 with reference to FIGS. 1 to 9 of that publication and arranged to provide a 4:1 stretch in each of the longitudinal or machine direction (MD) and transverse direction (TD).

The stretching apparatus was provided with a four zone circulating air oven, the zones comprising preheat Zone 1, preheat Zone 2, stretching Zone 3 and annealing Zone 4. The temperatures and lengths of the respective zones and the sheet speed are tabulated below in Table 4:

TABLE 4

| Zones | Temperature (° C.) | Length (meters) | Speed in (meters/min) | Speed out (meters/min) |
|---|---|---|---|---|
| Zone 1 | 139 | 1.0 | 10.4 | — |
| Zone 2 | 138 | 1.0 | — | — |
| Zone 3 | 130 | 1.5 | — | 43.8 |
| Zone 4 | 115 | 2.0 | — | 43.8 |

The web gripping devices which were initially at a pitch of about 38 mm were heated to approximately 100° C. prior to contacting the sheet.

The composite plastics film thus produced and having an average thickness of 0.094 mm and nominal substance of 75 gsm was cooled, edge trimmed and passed through a corona discharge treatment unit adjusted to give a treatment level such that the wettability of the surface of each outer layer was greater than 40 dynes/cm and then reeled.

The wettability of the product was determined by the application of Sherman Surface Tension INk 45 dynes/cm, formulated to demonstrate a wettability of at least 45 dynes/cm.

The composite plastics films of the present invention could be readily printed upon using conventional lithographic and gravure printing techniques.

The physical properties of the composite plastics films of the present invention thus produced were as follows:

TABLE 5

| Substance (g/m²) | 75 |
|---|---|
| Thickness | 94µ |
| Tensile Strength (N/mm²) | |
| MD | 35.9 |
| TD | 33.4 |
| Elongation at Break (%) | |
| MD | 156 |
| TD | 191 |
| Stiffness (Kg/m) | |
| MD | 2.5 |
| TD | 2.4 |
| Surface Cohesion (N/25 mm) | |
| Face A | 7.5 |
| Face B | 7.7 |
| Brightness (ISO 2470) (%) | 89–90 |
| Opacity (%) | 84.8 |

EXAMPLE 2

As a further example of the coated product, a water-based coating was separately applied to a coextruded sheet of synthetic paper (as described above in Example 1) as follows:

TABLE 6

| Component | Parts by Wt |
|---|---|
| Water | 315 |
| Ammonia | 33 |
| Ammonium Acrylate (Dispex ® A40 ex Allied Colloids) | 4 |

The above components were premixed using low shear and then to this mixture was added with high shearing:

| Components | Parts by Wt |
|---|---|
| Kaolin (SPS ex English China Clay Ltd) | 200 |
| Ground Calcium Carbonate (Hydrocarb ® 60 ex Omya) | 350 |

After 30 minutes, the formulation resulting from the above mixing was added to the following mixture using low shearing:

| Components | Parts by Wt |
|---|---|
| Acronal ® 305D* | 312 |
| Acronal ® 360D** | 71 |

*A water-based dispersion of n-butyl actylate/styrene copolymer (ex BASF)
**A water-based dispersion of acrylonitrile/n-butyl actylate/styrene copolymer (ex BASF)

To the resultant mixture was added the following to form the coating formulation:

| Components | Parts by Wt |
|---|---|
| Ammonium Zirconium carbonate | 39 |
| Non-ionic surfactant (Levapon ® TH ex Bayer) | 0.5 |

The coating formulation so produced was applied to both sides of the sheet from Example 1 using a single roll application and air knife to control the coat weight.

The coextruded sheet with the coating applied thereon (web) was dried at 70° C. and at a coating speed of 70 mm m/minute to give a final web temperature of 60° C. The final dried coating weight was 10 gsm per side. The resulting coated sheet gave excellent printability from sheet fed lithographic printing. In this process, if necessary, the coating formulation can be a solvent-based coating instead of a water-based coating, and to the formulation, depending upon the coating machine use, an antifoam can be added and the viscosity of the formulation controlled using an acrylic thickener.

We claim:

1. A formulation for making a composite plastics film or sheet comprising a polyolefin, a filler and a voiding agent, characterized in that the voiding agent is a pentaerythritol ester of maleic rosin and is in the range from 1–30% by weight of the polyolefin.

2. A formulation according to claim 1 wherein the pentaerythritol ester of maleic rosin comprises the pentaerythritol ester of the reaction product between maleic anhydride and abietic acid.

3. A formulation according to claim 1 wherein the pentaerythritol ester of maleic rosin has an average minimum softening point of 168° C.

4. A synthetic paper comprising at least one printable surface layer and at least a base layer, said paper comprising a formulation comprising a polyolefin, a filler and a voiding agent, wherein the voiding agent is a pentaerythritol ester of maleic rosin.

5. A synthetic paper according to claim 4 wherein the surface layer and the base layer are formed either:

A. by single extrusion of a single composition in which the surfaces and the core portion of the single extrudate represent the surface and base layers respectively, or B. by co-extrusion of a composite from two or more compositions where the relatively thicker of two layers forms the base layer and the relatively thinner of the two layers represents the surface layer, or C. by lamination of a plurality of layers whereby at least one of the outermost layers represents the surface layer and the layer(s) below said surface layer or in between the two outer surface layers represent the base layer, or D. by applying a coating of the printable layer on the surface layer of a composite produced by any of the methods (A) to (C) above.

6. A synthetic paper according to claim 4 wherein said paper includes fillers to provide an opaque white surface.

7. A synthetic paper according to claim 6 wherein the fillers are inert minerals selected from chalk, silica and clay.

8. A synthetic paper according to claim 4 wherein the ink-printable surface thereof is subjected to a corona discharge treatment to improve ink laydown and adhesion thereon.

9. A synthetic paper according to claim 4 wherein the ink-printability of the surface layer is improved by applying on said surface a coating comprising a major amount of an absorbent filler and a minor amount of an adhesive binder.

10. A synthetic paper according to claim 4 wherein the base layer of the synthetic paper comprising polyolefins, filler and the voiding agent comprise in addition other components selected from pigments, fillers and rubbers.

11. A synthetic paper according to claim 4 wherein the composition of the base layer comprises a blend of an orientable thermoplastic olefin polymer and about 5–15% w/w of pentaerythritol ester of maleic rosin per hundred parts of the polyolefin in the blend.

12. A synthetic paper according to claim 11 wherein the orientable thermoplastic olefin polymer is high density polyethylene.

13. A synthetic paper according to claim 11 wherein the pentaerythritol ester of maleic rosin forms, at least in part, a separate phase uniformly distributed within the olefin polymer contained in the total composition of the base layer such that the composition is capable of being extruded and stretched to form a base layer having a voided structure.

14. A synthetic paper according to claim 4 wherein the base layer has the composition shown in Table I below:

TABLE I

Base Layer Composition

| Component | Parts by Weight |
|---|---|
| High density polyethylene (copolymer) | 100 |
| Pentaerythritol ester of maleic rosin | 5–15 |
| Polystyrene | 4.5–5.5 |
| High density polyethylene | 17.5–21 |

TABLE I-continued

Base Layer Composition

| Component | Parts by Weight |
|---|---|
| (homopolymer) | |
| Calcium carbonate filler | 15–25 |
| Titanium dioxide | 5–10 |
| styrene-butadiene copolymer | 0–1.0 |
| Calcium oxide | 0.4–1.0 |

15. A synthetic paper according to claim 4 wherein the base layer composition further includes an antioxidant and/or a lubricant.

16. A synthetic paper according to claim 4 wherein the thickness of the base layer is greater than about 10 μm.

17. A synthetic paper according to claim 4 wherein the surface layer comprises a polyolefin or a mixture of olefin polymers.

18. A synthetic paper according to claim 17 wherein the printable surface layer has a surface which is textured or modified by the presence of a pigment and/or a filler and/or a pentaerythritol ester of maleic rosin and has a printability corresponding to a wettability of at least 40 dynes/cm.

19. A synthetic paper according to claim 4 wherein the printable surface layer has a thickness below 50 μm.

20. A synthetic paper according to claim 17 wherein said surface layer composition includes additives selected from a lubricant (0–0.4% w/w); a wax, stearic acid or a metal stearate, especially calcium stearate; and an antistatic agent (0–2% w/w) of the ethyoxylated amine type, all weights being based on the weight of the principal polyolefin component of the composition.

21. A synthetic paper according to claim 4 wherein the pentaerythritol ester of maleic rosin is present as the voiding agent both in the surface layer and in the base layer.

22. A synthetic paper according to claim 4 wherein said paper is in the form of a film or sheet which is oriented by stretching in a uniaxial or biaxial direction(s) carried out sequentially or simultaneously.

* * * * *